United States Patent
Hamada et al.

(10) Patent No.: US 8,101,312 B2
(45) Date of Patent: Jan. 24, 2012

(54) FUEL CELL STACK WITH IMPROVED RESISTANCE TO FLOODING

(75) Inventors: Shigetaka Hamada, South Glastonbury, CT (US); Masaaki Kondo, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 821 days.

(21) Appl. No.: 12/223,100

(22) PCT Filed: Jan. 25, 2007

(86) PCT No.: PCT/IB2007/000166
§ 371 (c)(1),
(2), (4) Date: Aug. 14, 2008

(87) PCT Pub. No.: WO2007/085943
PCT Pub. Date: Aug. 2, 2007

(65) Prior Publication Data
US 2011/0200903 A1 Aug. 18, 2011

(30) Foreign Application Priority Data
Jan. 26, 2006 (JP) ................................. 2006-017016

(51) Int. Cl.
*H01M 8/04* (2006.01)
(52) U.S. Cl. ........ 429/450; 429/444; 429/445; 429/414; 429/491

(58) Field of Classification Search .................. 429/450, 429/443, 444, 445, 432, 431, 414, 427, 471, 429/452, 491, 492
See application file for complete search history.

(56) References Cited

U.S. PATENT DOCUMENTS

| 4,761,348 A | 8/1988 | Kunz et al. |
| 6,537,690 B1 * | 3/2003 | Karrupaiah et al. .......... 429/430 |
| 7,977,011 B2 * | 7/2011 | Inagaki ......................... 429/509 |
| 2003/0180586 A1 * | 9/2003 | Hagans et al. ................... 429/13 |
| 2004/0115486 A1 * | 6/2004 | Takeshita et al. ................ 429/9 |
| 2004/0137295 A1 | 7/2004 | Houlberg |
| 2004/0202909 A1 | 10/2004 | Knights |
| 2005/0271924 A1 * | 12/2005 | Coors et al. ..................... 429/34 |

FOREIGN PATENT DOCUMENTS

| JP | 08-306375 A | 11/1996 |
| JP | 2003-086229 A | 3/2003 |
| JP | 2004-103455 A | 4/2004 |
| JP | 2004-111118 A | 4/2004 |

(Continued)

OTHER PUBLICATIONS

Office Action issued Sep. 20, 2011 in Japanese Priority Application No. 2006-017016 and partial English translation thereof.

*Primary Examiner* — Raymond Alejandro
(74) *Attorney, Agent, or Firm* — Kenyon & Kenyon LLP (57) ABSTRACT

A fuel cell stack include a first group of cells, provided in the vicinity of the overall negative end of a fuel cell stack, and second group of cells, provided throughout the remainder of the fuel cell stack. The first cells have a higher resistance to flooding than the second cells, and the overall polarity of the fuel cell stack is reversed, the end of the stack where the water content is largest is made overall positive.

6 Claims, 12 Drawing Sheets

FOREIGN PATENT DOCUMENTS

| | | |
|---|---|---|
| JP | 2004-179061 A | 6/2004 |
| JP | 2004-179086 A | 6/2004 |
| JP | 2004-342332 A | 12/2004 |
| JP | 2005-056671 A | 3/2005 |
| JP | 2005-183040 A | 7/2005 |
| JP | 2005-267995 A | 9/2005 |
| JP | 2005-340173 A | 12/2005 |
| JP | 2006-179381 A | 7/2006 |
| JP | 2007-200675 A | 8/2007 |
| WO | 2005/006477 A1 | 1/2005 |

\* cited by examiner

POSITIVE SIDE     NEGATIVE SIDE

NORMAL ELECTRICAL GENERATION

FIG. 8

WATER CONTENT AMOUNT
DURING NORMAL
ELECTRICAL GENERATION

FIG. 9

ELECTRICAL GENERATION
WITH REVERSED POLAARITY

FIG. 10

WATER CONTENT AMOUNT
DURING REVERSED POLARITY

FUEL CELL STACK WITH IMPROVED RESISTANCE TO FLOODING

This is a 371 national phase application of PCT/IB2007/000166 filed 25 Jan. 2007, claiming priority to Japanese Patent Application No. 2006-017016 filed 26 Jan. 2006, the contents of which are incorporated herein by reference.

BACKGROUND OF THE INVENTION

1. Field of the Invention

The present invention relates to a fuel cell stack.

2. Description of the Related Art

A fuel cell, for example a solid polymer electrolyte fuel cell, is formed by an MEA (membrane-electrode assembly) that is sandwiched between separators. A module is formed of at least one unit fuel cell, and the stacking of a plurality of modules (the stacking direction being arbitrary) forms a fuel cell stack. In generating electricity with a fuel cell stack, the distribution of water content may become uneven in the cell stacking direction, and result in a voltage reduction due to flooding at the stack location where excess water has collected. As a corrective measure, the Japanese Patent Application Publication No. JP-A-2004-179061 indicates the end part of the stack in the stacking direction, opposite the gas supply end, is a location that is easily flooded (with excess water), and proposes placing one of a "cell in which flooding does not easily occur," a "cell capable of maintaining a high electrical generation efficiency even if flooded," or a "cell having tolerance to flooding" or the like, at the end opposite the gas supply end or at both ends of a stack, this cell having performance that is different from other cells.

In the above-noted constitution, however, there is the following problem.

In actuality, it is not known what part of the stack is prone to flooding. In JP-A-2004-179061, the end of the stack in the cell stacking direction that is opposite the gas supply end is indicated as a location that is prone to flooding (with excess water). However, the end of the stack opposite the gas supply end may not be the location where water tends to accumulate. Therefore, in such case, even if a cell with good water drainage property is disposed at the end of the stack opposite the gas supply end, the flooding is not suppressed.

The identification of the location in the stack (or at which stack end) where water tends to accumulate must be determined experimentally, and is troublesome.

If cells having good water drainage property are disposed at both ends of a stack to accommodate so that the flooding is suppressed regardless of the location of the end of the stack, at which water tends to accumulate, there is a cost problem because cells having good water drainage property are expensive.

SUMMARY OF THE INVENTION

The present invention provides a fuel cell stack in which a cell that suppresses flooding is provided at only the location where the stack is prone to flooding, e.g., at only one end, rather than both ends, of the stack in the case in which the location at which flooding occurs easily is at one end of the stack.

A first aspect of the present invention relates to a fuel cell stack in which first cells are provided at and in a vicinity of an overall negative end of a fuel cell stack; and second cells are provided throughout a remainder of the stack, the first cell having a higher resistance to flooding than the second cell.

An example of a structure which has a high resistance to flooding is one in which the cross-sectional area of the gas flow passage of the first cell is larger than that of the second cell.

Another example of a structure which has a high resistance to flooding is one in which the water drainage property of the surface in which the gas flow passage of the separator is formed in the first cell is better than in the second cell.

Yet another example of a structure which has a high resistance to flooding is one in which the adhesive layer between separators of the first cell is thicker than that of the second cell.

The inventors of the present invention verified that accumulation of water in fuel cells in the cell stacking direction is seen in approximately 10 cells at one end part in the cell stacking direction of a stack (and is prominent in approximately 5 cells at the end part), and that cells at the other end part and the vicinity in the cell stacking direction of the stack are dry.

The inventors also discovered that the end of the stack (and the vicinity thereof) at which water tends to accumulate is not related to the supply direction of gas to the stack, but is related to the overall positive and overall negative polarity of the stack, water accumulating at the overall negative side of the stack and the overall positive side of the stack being dry.

Based on the foregoing verification and discovery, a fuel cell stack according to the present invention enables identification of location at which flooding occurs easily as the overall negative side of the stack. Because cell(s) in only the identified location is imparted a structure which has a high resistance to flooding (hereinafter, referred to as "a high-resistance flooding structure"), it is possible to reduce the number of cells having a high-resistance flooding structure compared with the case of imparting a high-resistance flooding structure to all cells in which flooding might occur, thereby providing a cost advantage. For example, compared with the case in which cells at both ends of a stack and the vicinities thereof were made cells which have the high-resistance flooding structure (hereinafter, referred to as "high-resistance flooding cells"), in the present invention it is possible to make only cells at the overall negative side and the vicinity thereof high-resistance flooding cells, thereby, for example, halving of the number of high-resistance flooding cells and providing a cost advantage.

If the cross-sectional area of the gas flow passage of the first cell is larger than that of the second cell, the pressure loss is reduced, so that, compared to the case where the cross-sectional areas are the same, a larger amount of gas flows, and the water can be ejected by this larger amount of gas from the gas flow passage within the cell, so that flooding is unlikely to occur.

If the water drainage property at the surface that forms the gas flow passage in the separator in the first cell is better than in the second cell, the flooding is prevented, because the water is drained from the gas flow passage within the cell before the water can accumulate. Water drainage property is affected by whether the gas flow passage surface is hydrophilic or water repellant. In the case of high hydrophilicity, water drops are unlikely to be formed, and as a result blockage of the flow passage due to water drops is unlikely to occur. Therefore, the water drainage property increases. In the case of good water repellency, although water drops are easily formed, water is less prone to adhere to the surface of the gas flow passage and, as a result, the water drainage property is improved. It is possible to adjust the degree of hydrophilicity and the degree of water repellency in accordance with the cross-sectional area of the gas flow passage, and the distance from the inlet to the outlet of the gas flow passage, for example.

If the thickness of the adhesive layer of the first cell is greater than that of the second cell, the electrical insulation between the anode-side separator and the cathode-side separator that are in opposition and surround the MEA of the cell improves, there is a reduction in the number of minute electrical shorts via the adhesive layer, and a commensurate reduction in the amount of water produced by the minute shorts. Therefore, flooding is unlikely to occur.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements and wherein.

DETAILED DESCRIPTION OF PREFERRED EMBODIMENTS

An embodiment of a fuel cell stack according to the present invention is described below, with references made to FIG. 1 to FIG. 17.

The fuel cells (unit cells) 10 forming the fuel cell stack 23 are low-temperature fuel cells, for example of the solid polymer electrolyte type. These fuel cells 10 are installed, for example, in a fuel cell vehicle, but may also be used in other suitable applications.

Figure 15:
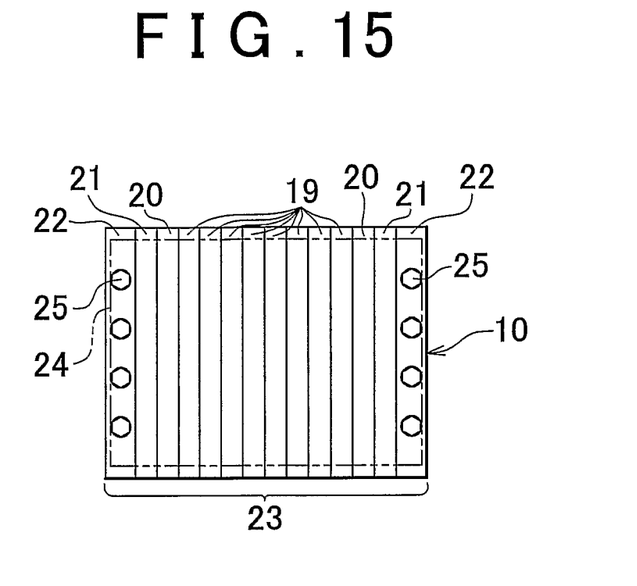
FIG. 15 is a simplified side view of the fuel cell stack of the embodiment.
Figure 16:
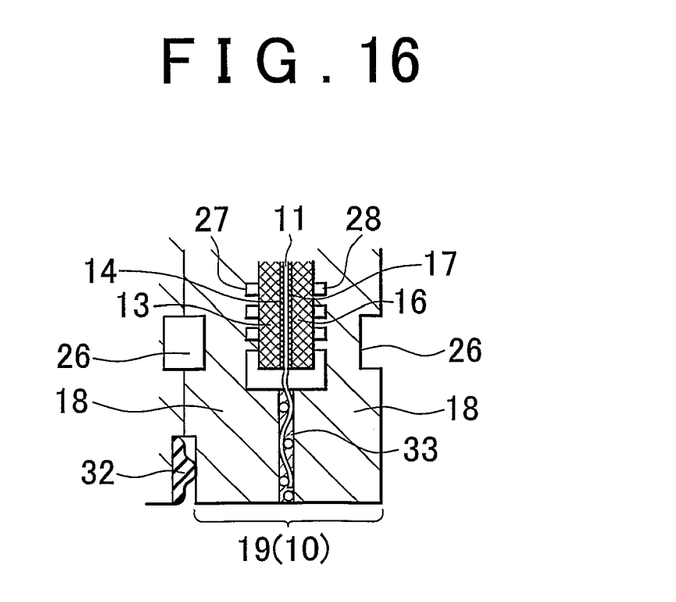
FIG. 16 is an enlarged cross-sectional view of part of the fuel cell stack of the embodiment.
Figure 17:
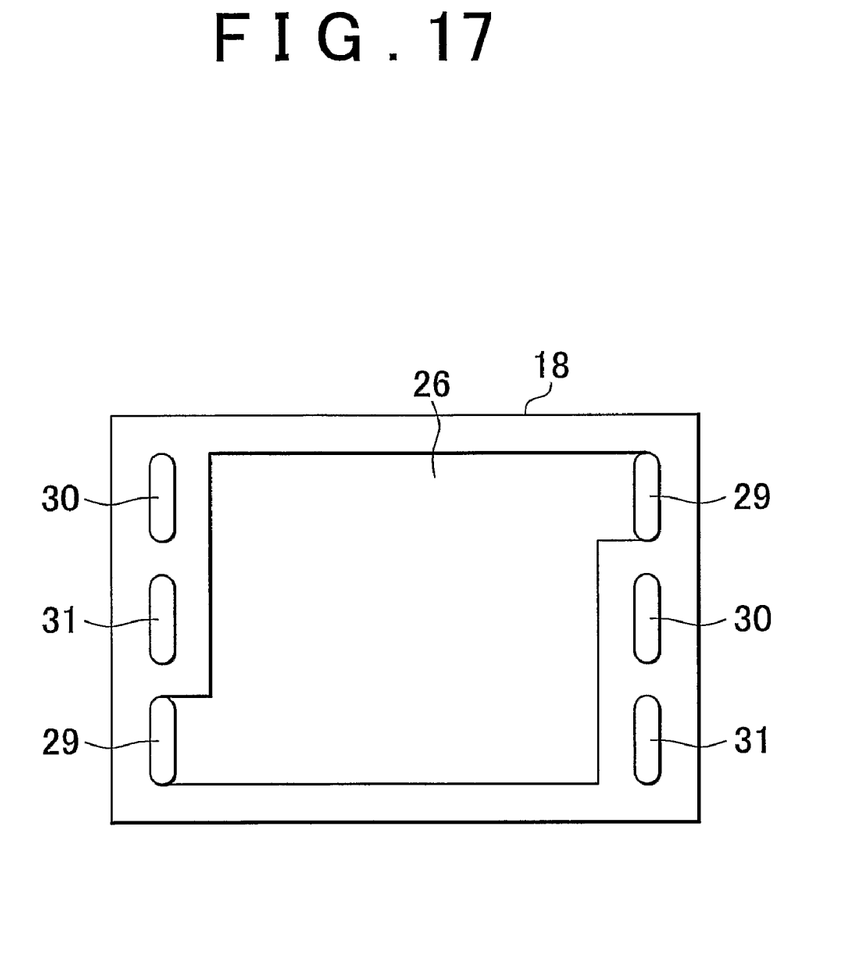
FIG. 17 is a simplified side view of a cell in the fuel cell stack of the embodiment.

As shown in FIG. 15 to FIG. 17, the solid polymer electrolyte fuel cell is formed by the stacking of an MEA (membrane-electrode assembly) and a separator 18.

The membrane-electrode assembly is formed by an electrolyte membrane 11 made from an ion exchange membrane, an electrode (anode; fuel electrode) 14 made of a catalyst layer disposed on one surface thereof and an electrode (cathode; air electrode) 17 made of a catalyst layer disposed on the other surface thereof. Diffusion layers 13 and 16 are provided on the anode side and cathode side between the membrane-electrode assembly and the separators 18.

Reactant gas flow passages 27, 28 (fuel gas flow passages 27 and oxidizing gas flow passages 28) are provided on the central portions of the separators 18 for supplying fuel gas (hydrogen) and oxidizing gas (oxygen; usually air) to the anode 14 and the cathode 17, and coolant flow passages 26 are provided on the opposite side of the separators 18 for permitting flow of coolant (usually cooling water).

A fuel gas manifold 30 for supplying and exhausting fuel gas to the fuel gas flow passages 27, an oxidizing gas manifold 31 for supplying and exhausting oxidizing gas to the oxidizing gas flow passages 28, and a coolant manifold 29 for supplying and exhausting coolant to the coolant flow passage 26 are provided in the peripheral portion of the separators 18.

The membrane-electrode assembly and separators 18 are stacked to form a unit cell 10, at least one cell forms a module 19 (the example illustrated is that of single-cell module), and a plurality of modules 19 are stacked to form a cell stack, with a terminal 20, an insulator 21, and an end plate 22 disposed in the cell stacking direction of the cell stack. The end plate 22 is fixed by a bolt and nut 25 to a joining member (for example, a tension plate 24) extending in the cell stacking direction at the outside of the cell stack, and the cell stack is tightened together in the cell stacking direction to form the fuel cell stack 23.

The gas-side seal 33 and coolant-side seal 32 are provided to seal the flow passages, 26, 27, 28, 29, 30, 31. In the example illustrated, the gas-side seal 33 is made of an adhesive (this being referred to by the same numeral 33 as the seal 33, since it is the same as the seal 33), and the coolant-side seal 32 is a rubber gasket. However, an adhesive or a rubber gasket may be used as either or both of the gas-side seal 33 and the coolant-side seal 32.

At the anode side of each cell 19 an electrolytic dissociation reaction occurs that separates hydrogen into hydrogen ions (protons) and electrons, the hydrogen ions migrate through the electrolyte membrane 11 to the cathode 17, where a reaction occurs that produces water from oxygen, hydrogen ions, and electrons (with electrons generated at the anode of the neighboring MEA arriving through the separator and electrons generated at the anode of a cell on one end in the cell stacking direction passing through an external circuit, and in this manner electricity is generated.

Anode reaction

Cathode reaction

At each cell 19, while water tends to accumulate at the cathode, where the water-producing reaction occurs, and downstream from the oxidizing gas flow passages 28, some water also accumulates at the anode, because it permeates through the electrolyte membrane 11.

As shown in FIG. 1 to FIG. 4 and FIG. 7 to FIG. 14, as time elapses during normal electrical generation, the distribution of water in the stack 23 in which cells 10 are stacked, becomes uneven in the cell stacking direction, and water accumulates and flooding occurs more easily at a plurality of cells at one end of the stack 23 in the cell stacking direction (a plurality of cells including the cell at the end and cells in the vicinity thereof) than in other cells. The plurality of cells at the other end of the stack 23 in the cell stacking direction tend to be dry. Although in the past, it was thought that the end of the stack at flooding occurs at was correlated to either the gas supply side to or gas exhaust side from the stack, experimentation by the inventors demonstrates that the side at which stack flooding occurs is unrelated to whether it is the gas supplying or gas exhausting side. That is, the side of the stack on which flooding occurs at was not previously known.

Figure 13:
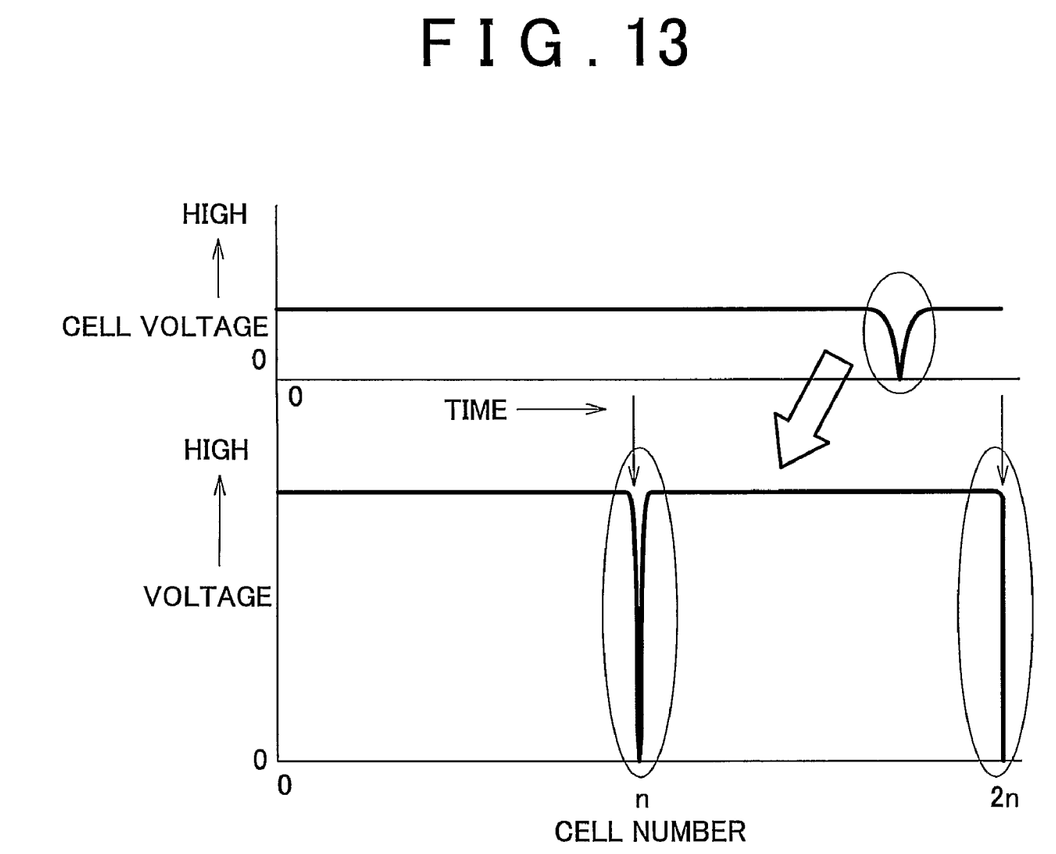
FIG. 13 is a graph of the cell voltage distribution (cell voltage versus cell number) in the two stacks of FIG. 11.

When flooding occurs, the supply of reactant gas to the catalyst electrodes is hindered, the voltage decreases, and electrical generation is hindered (FIG. 13). To solve this problem, there is the need to accurately determine the locations in the stack 23 that tend to flood, the conditions of the stack 23 when flooding occurs, and how the stack 23 and cells 10 should be configured so that flooding is less likely to occur.

The present inventors, hypothesizing that the water content amount distribution in the stack is correlated to the overall polarity of the stack, experimentally confirmed that the hypothesis is correct. Thus, the distribution of water in the stack is correlated to the overall polarity of the stack.

What was demonstrated by the experiments is described below.

Figure 11:
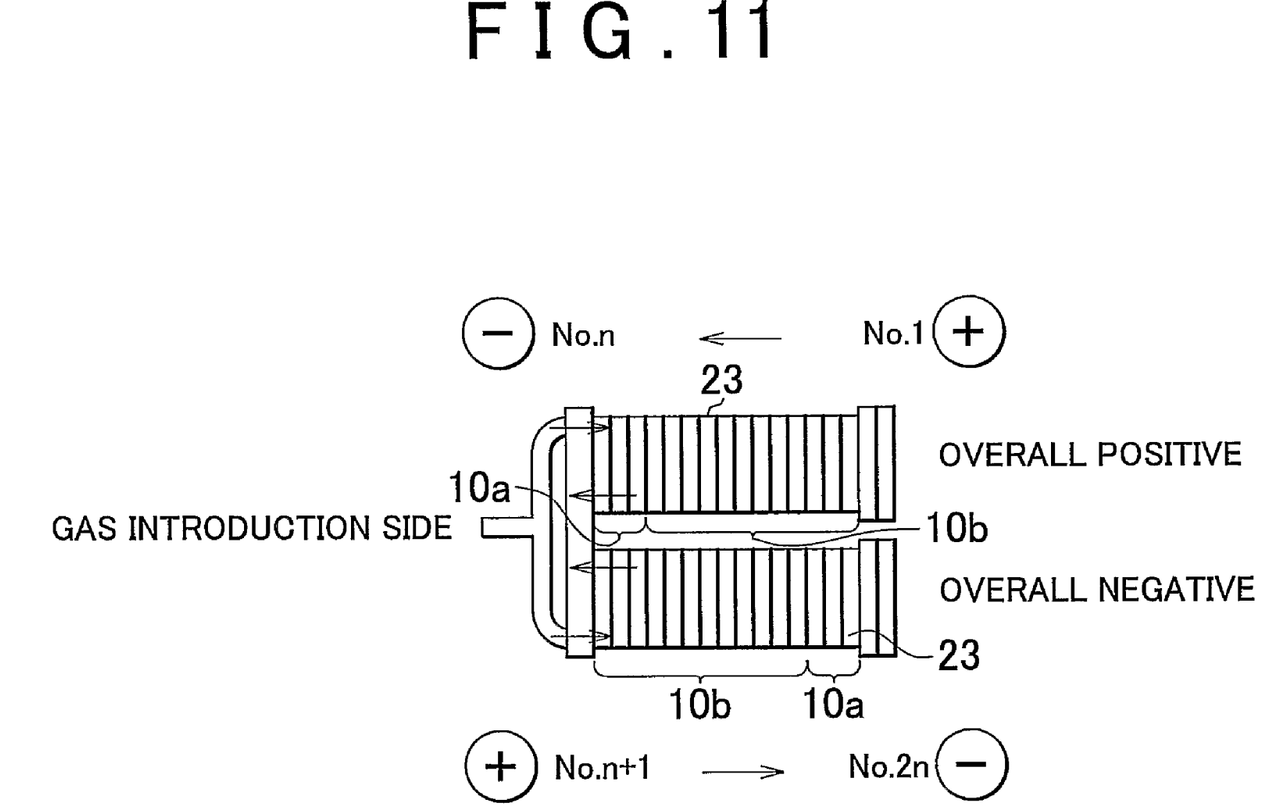
FIG. 11 is a simplified side view of the case in which two stacks used in an experiment to verify the relationship between polarity and water content and having n cells are disposed in parallel and electrically connected in series.

First, as shown in FIG. 11, two stacks, each of which has n stacked cells (where the value n is an appropriately selected number in the range 50 to 450, for example a number in the range 180 to 220) were disposed in parallel and electrically connected in series. Reactant gas was supplied to one end of each stack, caused to make a U-turn at the other end of the stack, and exhausted from the same end of the stack at which the reactant gas was supplied, as normal electrical generation was performed, during which time the distribution water (FIG. 12) and the cell voltage (FIG. 13) were measured.

Figure 12:
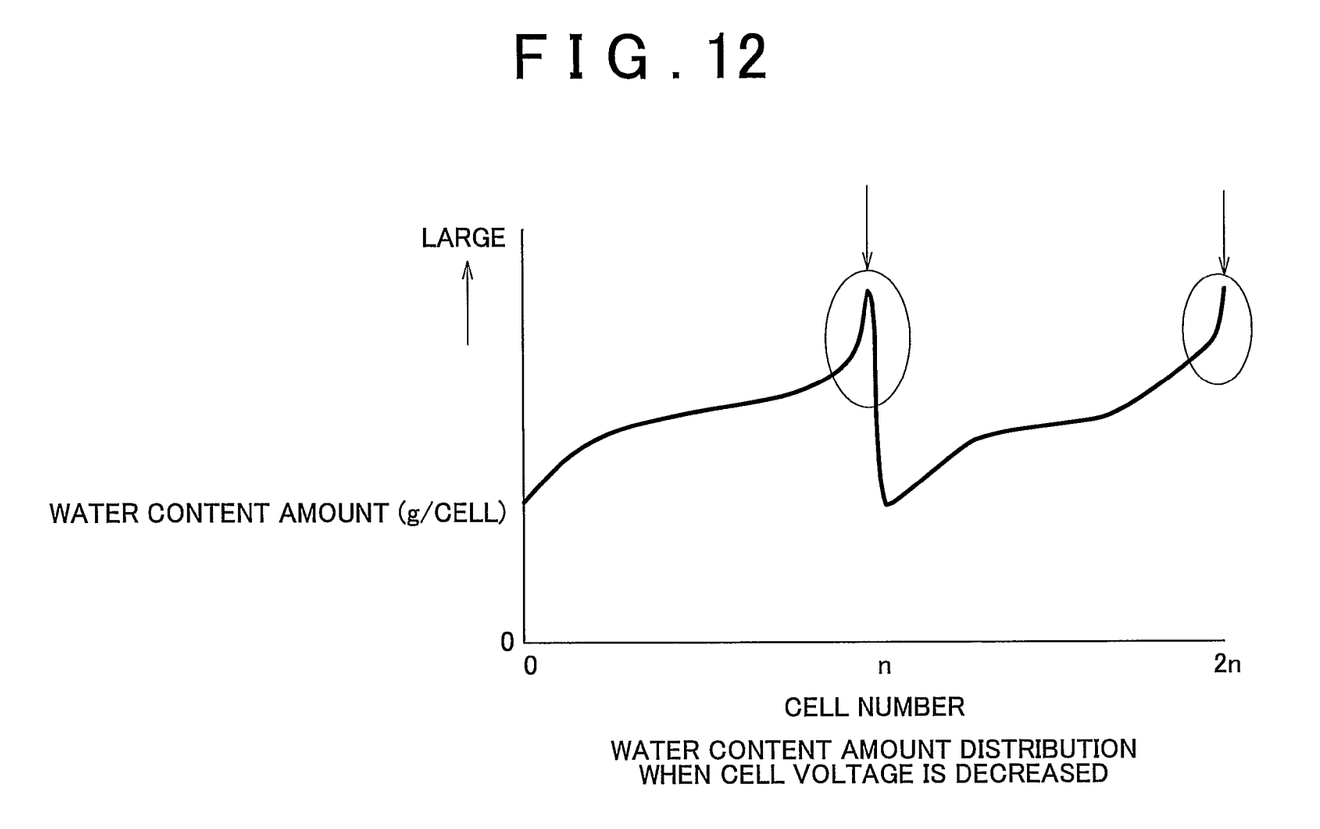
FIG. 12 is a graph of the distribution of water in the two stacks of FIG. 11.

As shown in FIG. 12, both stacks exhibited an increase in the amount of water content at the negative side. As shown in FIG. 13, in the cells in which the water content amount increased, there was a sudden decrease in the voltage.

FIG. 7 to FIG. 10 show a single stack 23 and the measured amount of water data thereof during normal electrical generation.

Figure 7:
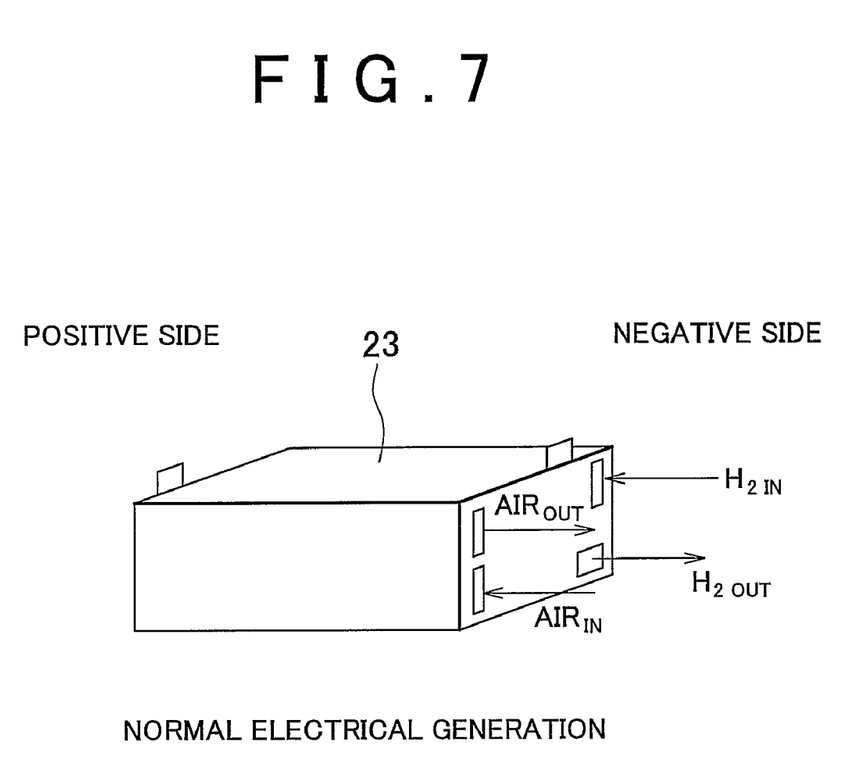
FIG. 7 is a simplified perspective view of the fuel cell stack according to the embodiment used in an experiment to verify the relationship between polarity and water content distribution during normal electrical generation (before polarity reversal)

In FIG. 7, hydrogen is introduced from the end of the stack 23 that will be the overall negative side, is caused to make a U-turn at the opposite side, which will be the overall positive side, and unconsumed hydrogen is exhausted from the same side that hydrogen is introduced. Air is introduced at the same side of the stack at which hydrogen is introduced, is caused to make a U-turn at the opposite side, and unconsumed air is exhausted from the same side that air is introduced.

Figure 8:
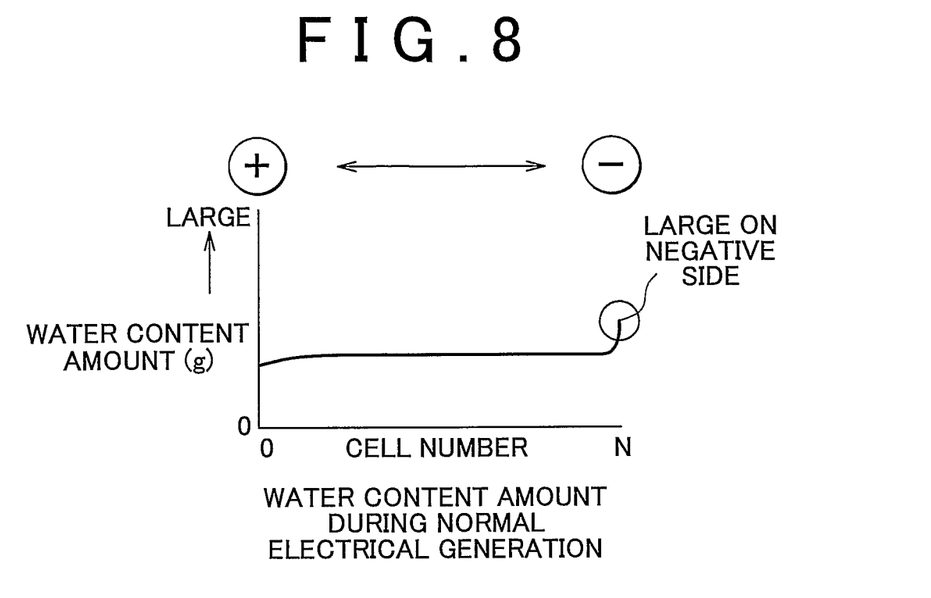
FIG. 8 is a graph of the distribution of water in the fuel cell stack according to the embodiment used in an experiment to verify the relationship between polarity and water content distribution during normal electrical generation (before polarity reversal)

The stack 23 was tested by stacking N cells (where N was an appropriately selected number in the range 40 to 300 and satisfying the condition N<n). The distribution of water was as shown in FIG. 8. There was an increase in the amount of water at the overall negative side of the stack 23 and cells in the vicinity thereof. The overall positive side was dry.

Figure 9:
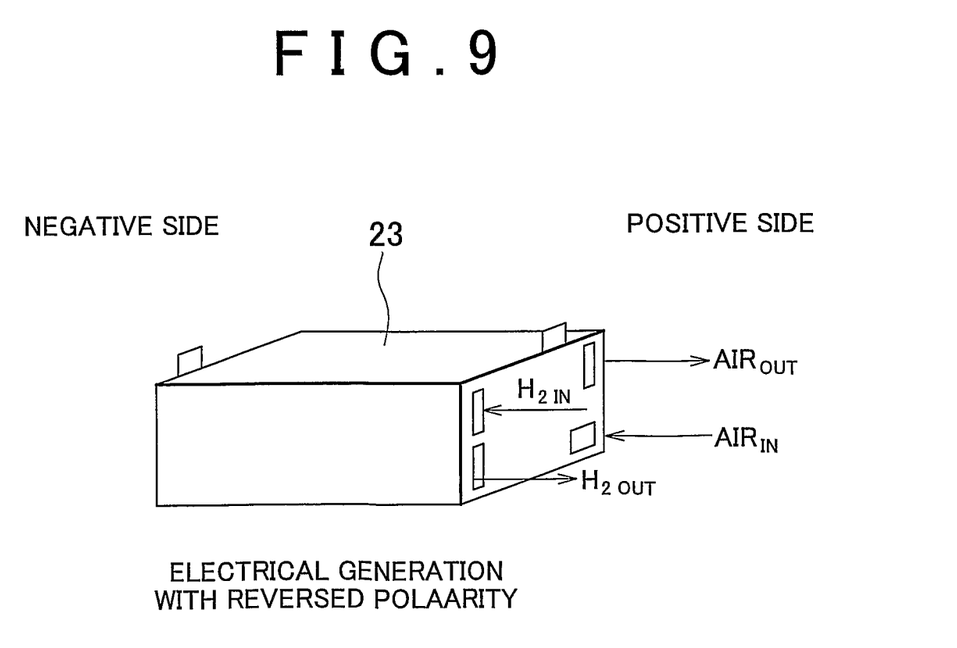
FIG. 9 is a simplified perspective view of the fuel cell stack according to the embodiment used in an experiment to verify the relationship between polarity and water content distribution after polarity reversal.
Figure 10:
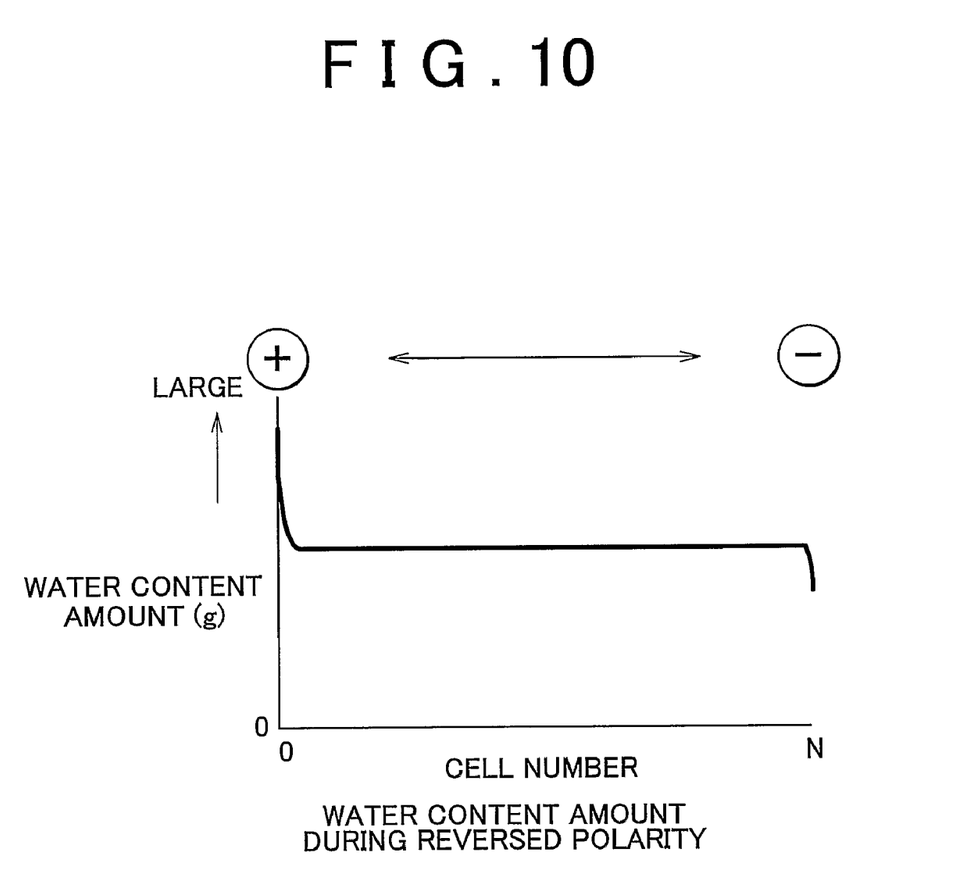
FIG. 10 is a graph of the distribution of water in the fuel cell stack according to the embodiment used in an experiment to verify the relationship between polarity and water content distribution after polarity reversal.

If the stack 23 is operated with the overall polarity reversed from the case shown in FIG. 7, the result is as shown in FIG. 9, and the water amount measurement results data in this case are as shown in FIG. 10. Because the polarity is reversed, the introduction of hydrogen and air is reversed from the case shown in FIG. 7. The distribution of water in this case, as shown in FIG. 10, shows an increase in the amount of water at the end of the stack that is overall negative in FIG. 9 and drier at the end of the stack that is overall positive.

Figure 14:
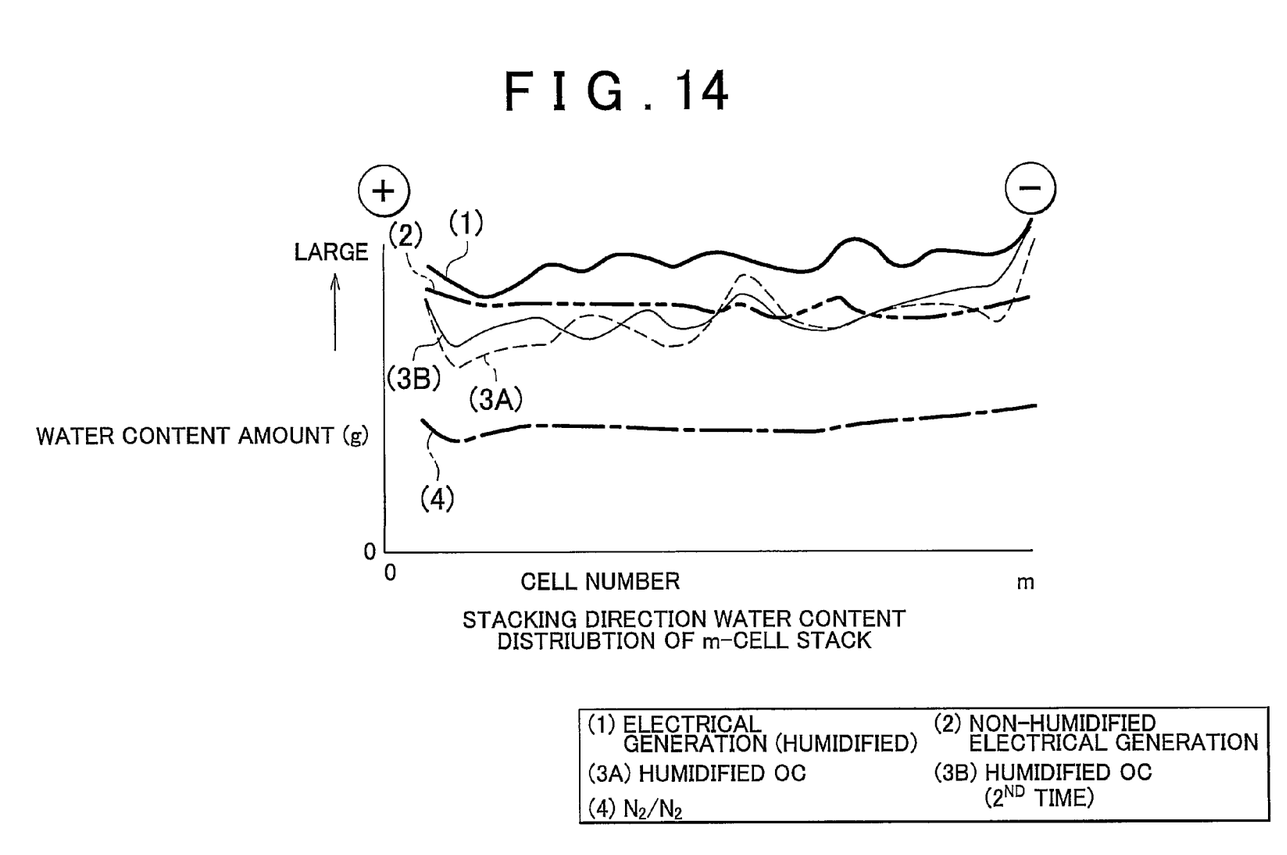
FIG. 14 is a graph of the distribution of water in the cell stacking direction of a stack having m cells.

FIG. 14 shows the results obtained by testing the distribution of water in the cell stacking direction, operating under various load conditions and various gas conditions, for stacks having m cells (where m is appropriately selected from 10 to 40, m<N). In the drawing, (1) is the case of humidified gas, (2) is the case of non-humidified gas, (3A, 3B) are cases of humidified gas, in which no load is taken (open circuit), 3A being the first time and 3B being the second time, and (4) is the case in which nitrogen has been flushed through the fuel gas flow passage and the oxidizing gas flow passage. It can be seen from FIG. 14, that an unevenness in the distribution of water occurs when gas flows, even if a load is not taken, that an unevenness in the distribution of water occurs only when humidified gas flows and that an unevenness in the distribution of water occurs even if nitrogen flows without electrical generation.

From FIG. 7 to FIG. 14, it can be seen that an increase and decrease in the amount of water always occur at the ends of the stack and the cells in the vicinity thereof, and that an increase and decrease in the water content amount at the end part of the stack is correlated to the overall negative and positive polarity of the stack.

From the above, it can be understood that the correlations shown in FIG. 1 to FIG. 4 exist between the polarity of the stack and the reversal thereof and the water content amount.

Figure 1:
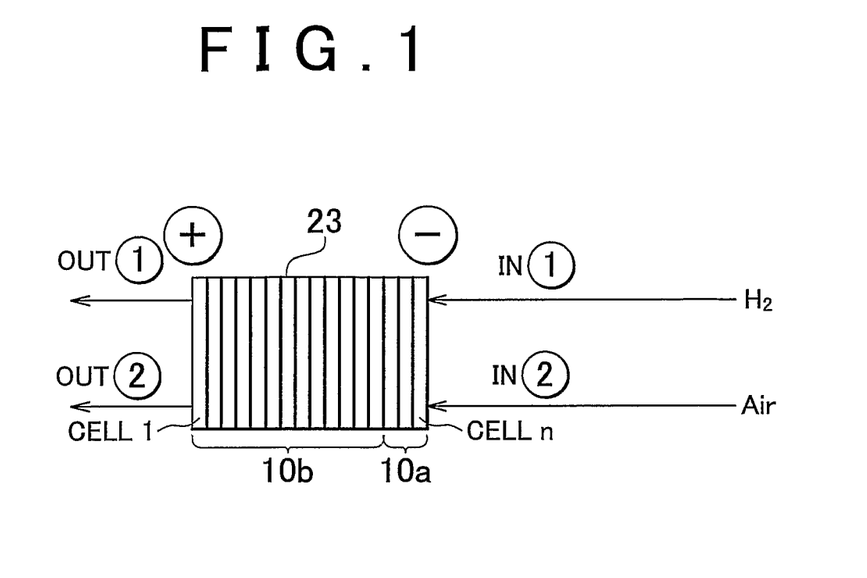
FIG. 1 is a simplified side view of a fuel cell stack according to an embodiment of the present invention during normal electrical generation (before polarity reversal)
Figure 2:
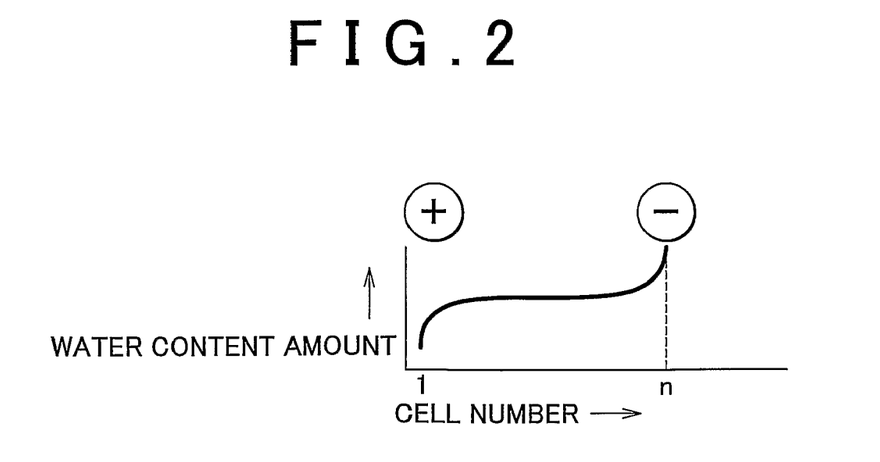
FIG. 2 is a graph of the distribution of water (amount of water versus cell number) in a fuel cell stack according to the embodiment of the present invention during normal electrical generation (before polarity reversal)

In normal operation of the stack 23, as shown in FIG. 1 and FIG. 2, the amount of water in the cell at the end part of the stack 23 that is at the negative side and a plurality of cells in the vicinity thereof is greater than that in the central cells of the stack, which have a substantially uniform water content amount, and also the amount of water tends to increase in the cells closer to the end cell. Also, the amount of water in the cell at the end of the stack 23 that is at the overall positive side and the cells in the vicinity thereof is less than that in the central cells of the stack, i.e., drier, and also the amount of water tends to decrease in the cells closer to the end cell.

Figure 3:
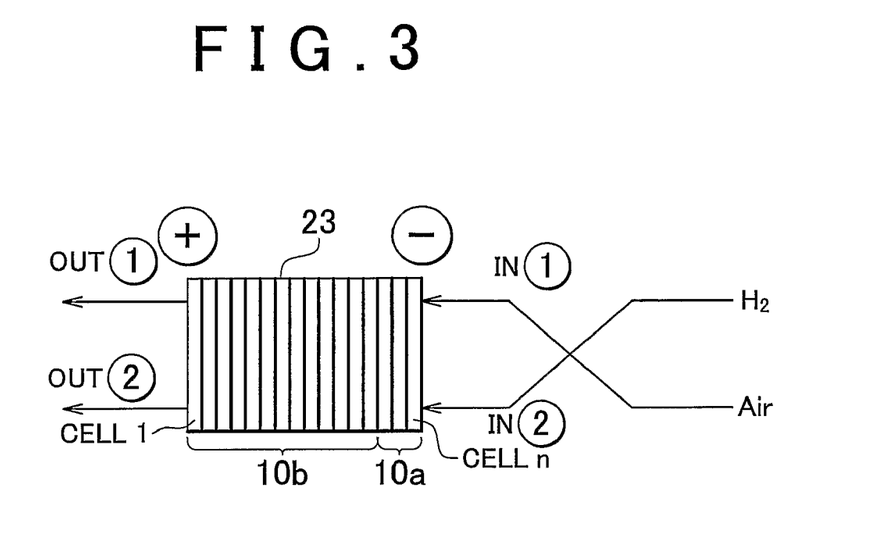
FIG. 3 is a simplified side view of the fuel cell stack according to the embodiment of the present invention after polarity reversal.
Figure 4:
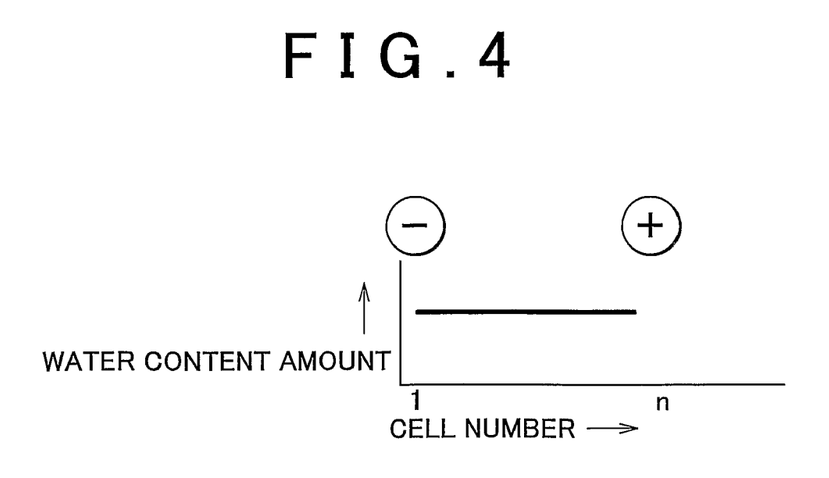
FIG. 4 is a graph of the distribution of water in a fuel cell stack according to the embodiment of the present invention after polarity reversal.

If the polarity of the fuel cell stack 23 is reversed in the cell stacking direction as shown in FIG. 3 (reverse of the case of FIG. 1), the distribution of water, as shown in FIG. 4, is such that the unevenness of the water content amount exhibited before the polarity reversal is equalized. That is, locations having a more water in FIG. 2 and having a less water in FIG. 4 cancel each other out, and the locations having a less water in FIG. 2 and having a more water in FIG. 4 cancel each other out. The result being that the water distribution in the cell is flattened in the cell stacking direction (to a water content amount, that is substantially the same as in the central cells of the stack).

An effective way to equalize the distribution of water in the cell slacking direction of the fuel cell stack 23 when the distribution is uneven is to reverse the overall polarity of the fuel cell stack 23 in the cell stacking direction. By reversing the overall polarity of the fuel cell stack 23, the end part of the fuel cell stack 23 in the cell stacking direction at which the water content is large (the end part that is at the negative side before polarity reversal) is made overall positive.

The overall polarity of the fuel cell stack 23 may be reversed for a given period of time only. Alternatively, the polarity of the fuel cell stack may be reversed to determine whether the distribution of water has been equalized and continuing the polarity reversal until it is determined that the distribution has been equalized.

In a single stack, as well as the case of a plurality of series-connected stacks, the overall polarity of the fuel cell stack 23 may be reversed either by switching the anode gas (fuel gas) and the cathode gas (oxidizing gas), or by applying an external power supply or regenerative voltage. FIG. 1 to FIG. 4 show the case of reversing the polarity of the fuel cell stack 23 by introducing the anode gas (fuel gas) and cathode gas (oxidizing gas) in reverse.

When equalizing the distribution of water in the fuel cell stack 23, it is desirable that the cell disposed at the overall negative side of the fuel cell stack 23 at which water tends to accumulate, as well as the cells in the vicinity thereof, have water drainage property that is better than the center part of the fuel cell stack 23. If the distribution of water is equalized by polarity reversal of the stack 23, reduction of the amount of water at the negative end of the fuel cell stack is promoted so that water content amount at the negative end becomes substantially uniform quickly by both the equalization of the distribution of water by polarity reversal and water drainage property of the cells. It is also possible, however, to equalize the distribution of water at the negative end of the fuel cell stack by only water drainage property of the cells.

Using cells having a structure that is different from that of cells in other locations for the purpose of increasing water drainage property of the cell is accompanied by an increase in cost, in order to suppress the increase in cost it is desirable that the location of installing a cell having good water drainage property be limited to the overall negative end of the cell in the cell stacking direction and the vicinity thereof.

From the above, in the fuel cell stack 23 first cells 10a provided at one end of the stack and the vicinity thereof (a plurality of cells at the end part including the endmost cell) that are overall negative during normal electrical generation have a structure having a higher resistance to flooding than that of second cells 10b provided at other locations in the stack.

For the purpose of equalizing the distribution of water at the stack end, the polarity of the stack is temporarily reversed. However, because the stack end that temporarily becomes overall negative returns to the polarity before the reversal when the water content amount is equalized, water is not excessive in the stack end that temporarily becomes overall negative. Therefore, it is not necessary to provide a high-resistance flooding cell at the stack end part that temporarily becomes overall negative after the reversal.

Figure 5:
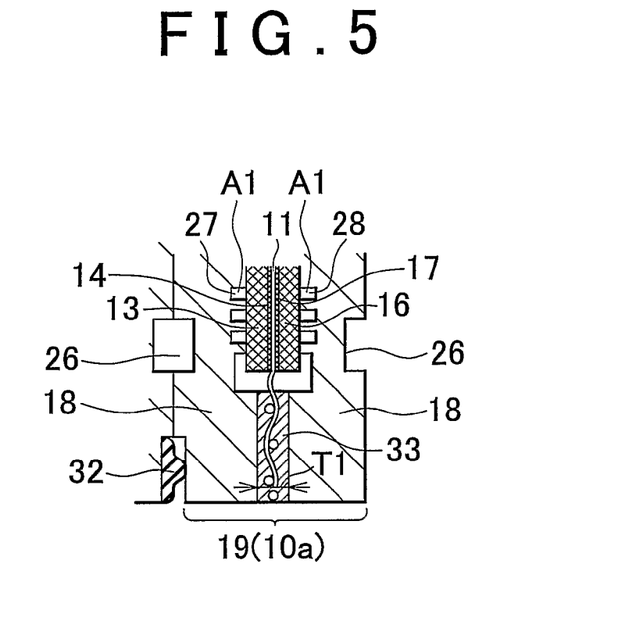
FIG. 5 is a partial enlarged cross-sectional view of a cell in the overall negative side end part and in the vicinity thereof in the stack of FIG. 1.
Figure 6:
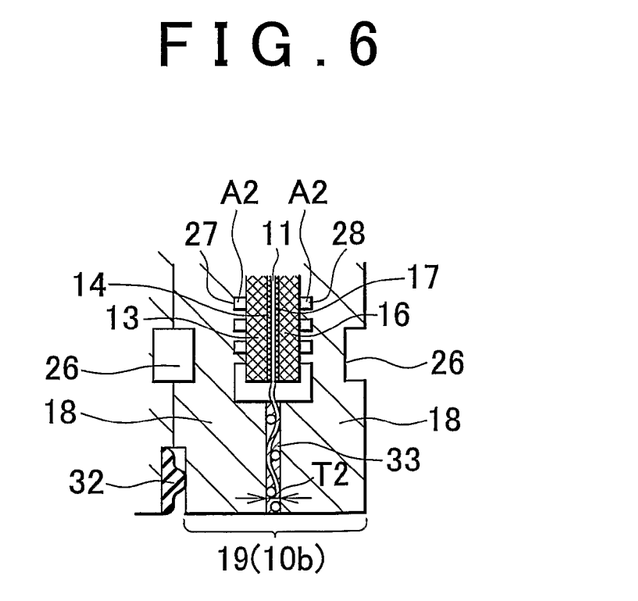
FIG. 6 is an enlarged cross-sectional view of a cell in a location other than the overall negative side end and the vicinity thereof in the stack of FIG. 1.

A high-resistance flooding structure may be obtained by one of the following structures (i), (ii), and (iii). FIG. 5 shows a partial cross-section of the first cell 10a (the overall negative end part of the stack during normal operation and a cell in the vicinity thereof), and FIG. 6 shows a partial cross-section of the second cell 10b.

(i) The first cell 10a has a cross-sectional area of the gas flow passage 27 and/or 28 in the separator 18 that is larger than that of the second cell 10b. If the gas flow passage cross-sectional area is increased, the pressure loss is reduced, and the amount of gas flowing through the gas flow passage 27 and/or 28 increases. Consequently, a large amount of water rides on this gas flow so that it is able to be ejected to the gas manifold. With the cross-sectional area of the gas flow passage of the first cell 10a in FIG. 5 as A1 and the cross-sectional area of the gas flow passage of the second cell 10b as A2, A1>A2.

If the gas flow passage is short, the pressure loss is also reduced, the amount of gas flow in the gas flow passage 27 and/or 28 of the first cell 10a increases, and a large amount of water content rides on this gas flow so that it is able to be ejected to the gas manifold. Therefore, in addition to making the cross-sectional area of the gas flow passage of the first cell 10a relatively large, the length of the gas flow passage of the first cell 10a may be made small or, instead of making the cross-sectional area of the gas flow passage of the first cell 10a relatively large, the length of the gas flow passage of the first cell 10a may be made small.

(ii) The first cell 10a has a surface in which the gas flow passage 27 and/or 28 is formed in the separator 18 that has good water drainage property compared to the second cell 10b. The water drainage property of the surface in which the gas flow passage 27 and/or 28 is formed can be adjusted by the coating of the gas flow passages 27 and/or 28, to change the hydrophilicity and water repellency of the surface in which the gas flow passage 28 and/or 28 are formed.

For example, if water drops form in the gas flow passage 27 and/or 28, and the water drops may block the gas flow passage 27 and/or 28 because the gas flow passage 27 and/or 28 has small cross-sectional area, the hydrophilcity of the surface in which the gas flow passage 27 and/or 28 is increased. For example, the surface in which the gas flow passage 27 and/or 28 is formed may be coated with a compound (for example, a resin) that has hydrophilic group. It is desirable to select the degree of hydrophilicity higher than a prescribed value by a wettability test using a reagent.

With a large gas flow passage cross-sectional area, in the case in which there is no possibility that the gas flow passage 27 and/or 28 will be blocked by water drops even if water drops form, it may be desirable to enhance the water repellency of the surface in which the gas flow passage 27 and/or 28 are formed. To enhance the water repellency, a coating layer of a compound having a hydrophobic group (for example, a resin) may be formed on the surface in which the gas flow passage 27 and/or 28 is formed.

(iii) The first cell 10a has a thicker adhesive layer 33 than the second cell 10b. Therefore, the insulation between the opposing anode-side and cathode-side separators that surround the MEA of the cell 10 is better, which reduces the shorting current. Accordingly, there is a commensurate reduction in the production of water caused by the shorting current. As a result, flooding is less likely to occur. If the thickness of the adhesive layer 33 of the first cell 10a in FIG. 5 is T1 and the thickness of the adhesive layer 33 of the second cell 10b in FIG. 6 is T2, T1>T2.

The operation and effect of the above-described fuel cell stack is described next.

Because high-resistance flooding cells are disposed at easily flooded portion and in the stack 23, flooding is unlikely to occur in all of the cells of the stack 23, to equalize the distribution of water in the cell stacking direction of the stack 23, and a drop in the voltage due to the flooding is unlikely to occur. However, when the distribution of water is upset by the accumulation of water at the overall negative end of a stack and the vicinity thereof and the polarity is reversed, by equalizing the distribution of water by the polarity reversal and the placement of a high-resistance flooding cell, there is a further suppression of flooding compared to the case in which the distribution of water is equalized by polarity reversal alone.

Because the overall negative end (plurality of cells at the end part including the endmost cell) is identified as the location in the stack 23 at which flooding tends to occur and cells (first cells) 10a, having a high-resistance flooding structure, are provided at the identified location, it is possible to reduce the number of cells (first cells) 10a having a high-resistance flooding structure, compared to the case in the past in which cells at all locations at which the flooding might occur were made to have a high-resistance flooding structure, thereby achieving a cost advantage.

For example, in comparison with conventional fuel cells stacks, in which the cells at both ends of the stack and the vicinity thereof may have a high-resistance flooding structure, in the embodiment of the present invention, because it possible to make only cells at the overall negative end and the vicinity thereof (and in the case in which polarity reversal of the stack 23 is done so as to equalize the water distribution in the cell stacking direction of the stack 23, only the cell at the end of the stack that is overall negative during normal electrical generation and the cells in the vicinity thereof) have a high-resistance flooding structure, it is possible to reduce the number of cells having a high-resistance flooding structure that are incorporated into the stack, thereby achieving a cost advantage.

If the cross-sectional areas of the gas flow passages 27, 28 of the separator 18 of the first cell 10a is made larger than the cross-sectional areas of the gas flow passages 27, 28 of the separator 18 of the second cell 10b, the pressure loss in the gas flow passages 27, 28 of the separator 18 of the first cell 10a is reduced, so that a greater amount of gas attempts to flow compared to the case in which the cross-sectional areas are the same. Therefore, it is possible for water content to ride on this large amount of gas and be expelled from the gas flow passage within the cell. As a result, flooding is unlikely to occur in the first cell 10a.

If the water drainage property of the surface in which the gas flow passages of the separator of the first cell 10a is made greater than the water drainage property of the surface in which the gas flow passages of the separator of the second cell 10b, it becomes easy for water that attempts to accumulate in the gas flow passages within the cell to exit from the gas flow passages 27, 28 within the cell to the gas manifolds 30, 31, and it is possible to prevent flooding from easily occurring in the gas flow passages 27, 28 within the cell. Because the water drainage property is influenced by the degree of hydrophilicity and degree of water repellency of the gas flow passage surfaces, the hydrophilicity and water repellency of the gas flow passage surface are caused to differ and are set appropriately in accordance with the cross-sectional area of the gas flow passages and the distance from the intakes or outlets of the gas flow passages.

By increasing the thickness of the adhesive layer 33 of the first cell 10a relative to the thickness of the adhesive layer 33 of the second cell 10b, the insulation quality between the opposing anode-side and cathode-side separators that surround the MEA of the cell 10 is improved. Thus, the occurrence of minute shorting current via the adhesive layer 33 is reduced, which results in a commensurate reduction in the production of water caused by the shorting current. As a result, flooding is unlikely to occur.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

The invention claimed is:

1. A solid polymer electrolyte fuel cell stack comprising:
a plurality of first cells, including a first cell, provided at and in a vicinity of an overall negative end of a fuel cell stack; and
a plurality of additional cells, including a second cell, provided throughout a remainder of the fuel cell stack,
wherein the first cell has a higher resistance to flooding than the plurality of additional cells,
wherein the overall polarity of the fuel cell stack is reversed so that a first end part of the fuel cell stack, at which a water content is larger than a second end of the fuel cell stack, is made overall positive,
wherein the overall polarity of the fuel cell stack is reversed either by switching an input location of either an anode gas or a cathode gas, and
wherein the distribution of water in the fuel cell stack is measured and the polarity reversal is continued until it is determined that the distribution has been equalized.

2. The fuel cell stack according to claim 1, wherein
a cross-sectional area of a gas flow passage in the first cell is larger than a cross-sectional area of a gas flow passage in the second cell.

3. The fuel cell stack according to claim 1, wherein
a gas flow passage of the first cell is shorter than a gas flow passage of the second cell.

4. The fuel cell stack according to claim 1, wherein
a water drainage property of a surface of a separator in which a gas flow passage is formed in the first cell is higher than a water drainage property of a surface of a separator of the second cell.

5. The fuel cell stack according to claim 1, wherein
a thickness of an adhesive layer between separators in the first cell is larger than a thickness of an adhesive layer between separators in the second cell.

6. A fuel cell stack according to claim 1, wherein the overall polarity of the fuel cell stack is reversed for a given period of time.

* * * * *